United States Patent [19]
Bryce

[11] Patent Number: 5,310,161
[45] Date of Patent: May 10, 1994

[54] HIGH PRESSURE GAS LINE BREAKAWAY CONNECTOR

[75] Inventor: Gordon Bryce, White Rock, Canada

[73] Assignee: Fuelmaker Corporation, Rexdale, Canada

[21] Appl. No.: 713,363

[22] Filed: Jun. 13, 1991

[51] Int. Cl.⁵ .............................................. F16L 37/28
[52] U.S. Cl. ................................. 251/149.6; 285/1
[58] Field of Search .......................... 285/1; 251/149.6

[56] References Cited

U.S. PATENT DOCUMENTS

| | | |
|---|---|---|
| 2,263,293 | 11/1941 | Ewald ................. 251/149.6 |
| 2,777,716 | 1/1957 | Gray .................. 251/149.6 |
| 2,952,482 | 9/1960 | Torres ................ 285/1 |
| 4,682,795 | 7/1987 | Rabushka et al. ....... 285/1 |
| 4,703,958 | 11/1987 | Fremy ................. 251/149.6 |

FOREIGN PATENT DOCUMENTS 635238   1/1962   Canada ............................ 251/149.6

*Primary Examiner*—A. Michael Chambers
*Attorney, Agent, or Firm*—David J. French

[57] ABSTRACT

An in-line connector for a hose is provided with an automatic release mechanism which allows the connector to uncouple when a predetermined level of tension is applied to the connector through the hose.

3 Claims, 2 Drawing Sheets

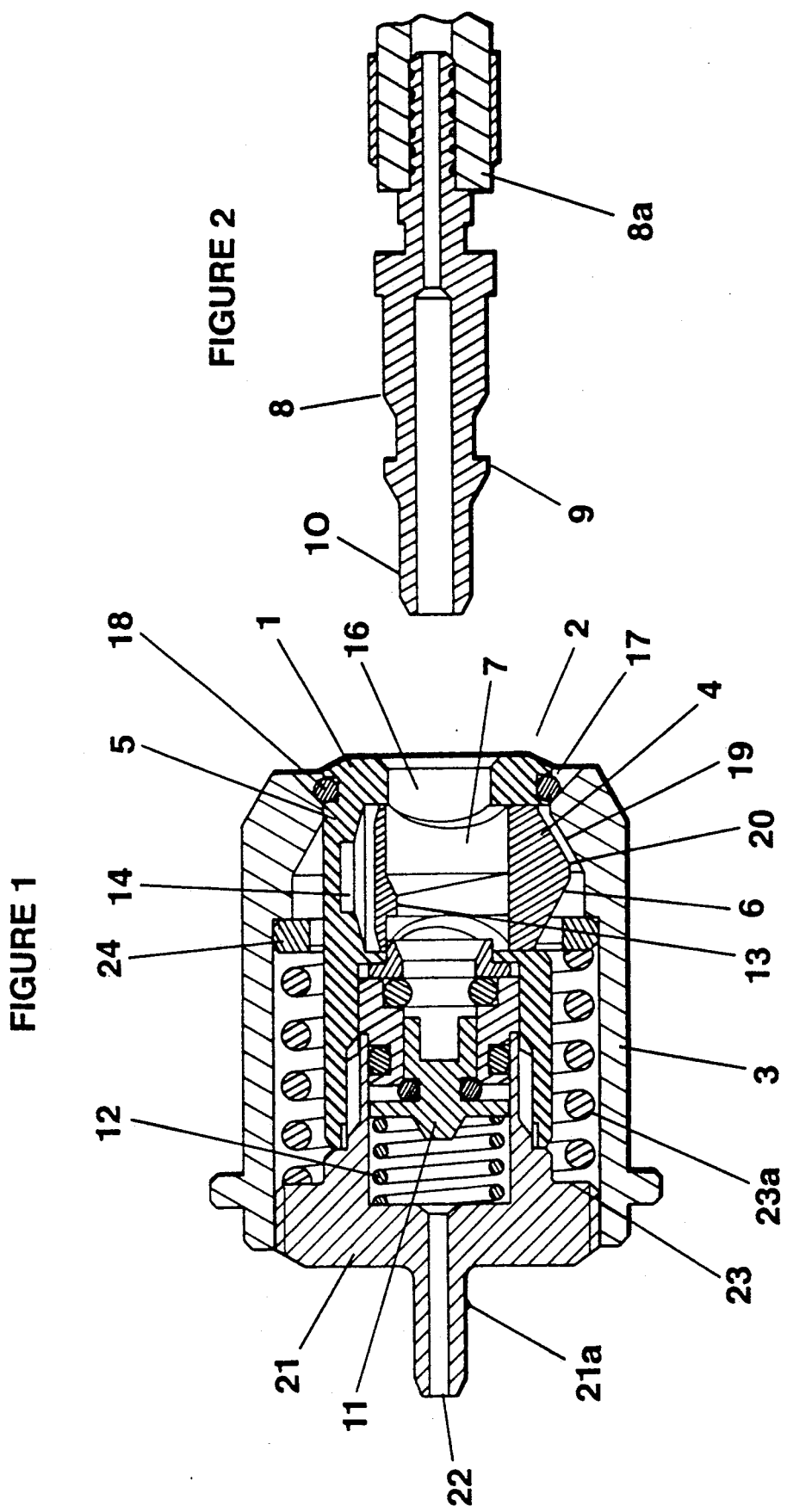

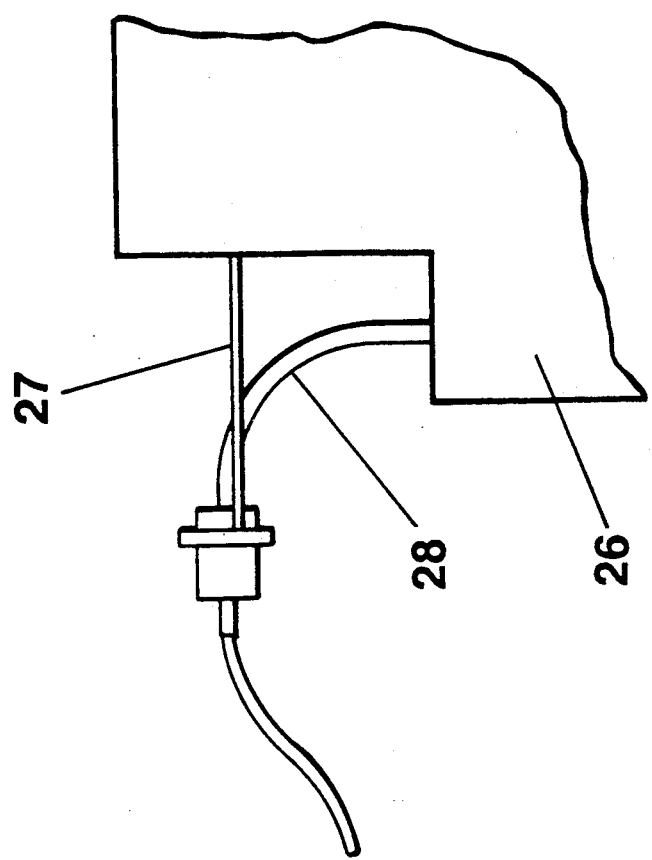

HIGH PRESSURE GAS LINE BREAKAWAY CONNECTOR

FIELD OF THE INVENTION

This invention relates to couplings for high pressure hose lines. In particular it relates to a hose coupling that will automatically disconnect when a predetermined level of tension is applied to the connector by pulling on the hose line. More particularly, the invention can be adapted to a coupling with an automatic shut-off feature, as where the line or hose being coupled carries a fluid, such as gas, hydraulic oil or steam under pressure and is provided with a check-valve to close off the line upon disconnection.

BACKGROUND TO THE INVENTION

In the handling of high pressure fluids it is known to provide hose connectors that include an internal shut-off or check valve. The check valve closes automatically on decoupling of the connector in order to prevent the leakage of gas or liquid from the disconnected coupling. Auto-shut off connectors are useful as well on high pressure air lines to prevent such lines from thrashing when disconnected.

Examples of patents that have issued for this class of connector includes U.S. Pat. No. 4,865,077 to Batchen, and U.S. Pat. No. 4,827,977 to Fink and Husky. Various commercial models previously in use include the HANSEN Coupling made by the Hansen Coupling Division of Tuthill Corporation of Cleveland, Ohio, TOMCO connectors by Tomco Division of C.S.P. Inc. of Willowick, Ohio and HOFMANN connectors by Hofmann Engineering Co. Inc. of Burr Ridge Ill.

In the Hansen design, which is typical, a male portion of the connector, called hereafter the "plug", is held in place within a female portion of the connector, called the "female coupling", by radially located steel balls. These balls are contained in a race around the inner circumference of the female coupling. The steel balls partially inter-fit into a complementary groove formed on the outer circumference of the plug, once the connector portions are assembled. The steel balls are radially displaceable within their race, but are held in an advanced, groove-engaging, locking position by an outer locking/release ring.

This outer ring is displaceable longitudinally, and carries an inner groove into which the steel balls may be displaced, once this groove is aligned with such balls. Adjacent the groove, an inner locking surface on the ring holds the balls in their advanced, locking position within the race when advanced to overlie the balls.

The locking/release ring is biased by a spring to advance along the connector until the locking surface overlies the steel balls. By overcoming this bias, i.e. by displacing the locking/release ring, the groove may be aligned with the steel balls to effect engagement and disengagement of the coupler portions.

The Hansen coupling requires manipulation to effect engagement of the coupling. That is, the locking/release ring must be displaced manually to allow the steel balls to recede within their race while coupling is effected. Other connectors provide for automatic engagement upon insertion of the plug into the female coupling.

In the field, connectors of the Hansen type have been rendered into auto-disengaging couplings that disconnect under tension developed by pulling on the line leading to the connector. This has been effected by anchoring the release ring to a stationary object by a linkage, such as a chain. Tension on the line causes the connector to move with respect to the release ring. Upon sufficient displacement of the connector with respect to the release ring, release is effected.

In the Hansen connector, the steel balls, which serve as a latch means, are continually subject to a pressure, arising from the tendency of the connector portions to separate. This pressure, if it were not for the presence of the locking/release ring in its appropriate position, would displace the steel balls and effect release of the coupling.

The Hansen-type coupling is relatively insensitive to line pressure as the thrust on the steel balls is partially absorbed by the race, and the frictional resistance between the locking/release ring and the steel balls is correspondingly reduced. Nevertheless, some resistance exists, and this residual resistance is proportional to line pressure.

Another type of connector in this field is that manufactured by S. A. Des Etablissements Staubli of France. This device, depicted in European Patent Application 82420113.1 and published as EP-0-077-734-A1, shows a connector wherein a transverse activating pin provides a double latching action for release of the connector. The focus of this patent is on the double latching action.

In both the Hansen and Staubli type connectors a single internal check valve, biased to close by a spring, may be provided. This check valve can be contained within a female portion of the connector, but could alternately or also be located in the male or plug portion. In all cases a probe carried on the opposing portion of the connector, when assembled, holds the check valve open.

The Staubli connector differs from the Hansen connector in that engagement of the connector does not require any manipulation of a locking ring or the like. Instead, engagement is effected by the mere application of insertion pressure on the plug into the female coupling whereby a bayonet-like engagement is effected. The barb-equivalent on the plug portion of the Staubli connector is a ring with a bevelled forward edge and a perpendicular rearward side. This rearward side engages with and is held in place by a first latching portion of the transverse activating pin, once the connector is assembled.

The double latching effect arising on uncoupling in the Staubli connector is achieved by a second latch portion on the activating pin that stops the withdrawal of the male plug portion of the connector after partial disconnection occurs. This interruption of the disengagement process allows the check valve to close and the line carrying the plug, which lacks its own check valve, to depressurize without thrashing. Release of the second latch allows full withdrawal to be effected.

The Staubli connector is manually operated. However, its feature of reliance on a transverse activating pin to effect decoupling can be adapted to provide a tension-activated auto-disengaging connector. Such a tension-activated connector is useful particularly where compressed gas is being pumped into a vehicle holding tank, as where cars are fueled by compressed natural gas. On occasion an operator may decide to move the vehicle, forgetting to manually disconnect the coupling on the fluid feed line. By providing a tension-activated coupler the risks of having a ruptured fluid line are eliminated.

The activating pin in the Staubli connector differs from the locking/release ring in the Hansen type connector in that the Staubli connector requires that pressure be applied to the activating pin or actuator so that unlatching of the connector may be effected. Because the barbed ring on the plug is held by a latch that is displaced transversely, there is no tendency for line pressure to disengage the latch. A positive displacement of the actuator by application of actuating pressure is necessary in order to cause the latch to disengage.

Accordingly, it is an object of this invention to provide a tension-activated auto-disengaging coupler that contains an actuator for the latch that is biased by a spring to resist actuation but contains a means that will automatically effect disengagement when a predetermined tension is applied to the coupling.

The invention is its general form will first be described, and then its implementation in terms of specific embodiments will be detailed with reference to the drawings following hereafter. These embodiments are intended to demonstrate the principle of the invention, and the manner of its implementation. The invention will then be further described, and defined, in each of the individual claims which conclude this Specification.

SUMMARY OF THE INVENTION

According to the invention a tension-activated auto-disengaging fluid line connector is provided that comprises:

(1) a connector with complementary, interfitting but disengageable male and female portions, one of such portions being provided with line coupling means for connection to a hose containing a source of high pressure fluid and thereby constituting the pressurized portion of the connector, the other portion of the connector constituting the non-pressurized portion of the connector.

(2) a spring-activated check valve contained within the pressurized portion of the connector, biased by a check valve spring mounted within the said pressurized portion to displace the check valve towards closure;

(3) a probe, forming the non-pressurized portion of the connector for opening the check valve upon assembly of the connector;

(4) latch means for releasably holding the male and female connector portions together, once assembled, (5) an actuator, connected to said latch means so as to effect release of the latch means by the application of pressure to the actuator, such actuator being accessible from outside of the connector;

(6) a housing, provided with a means for such housing to be anchored externally to a stationary body, such housing extending over the actuator and positioned to contact and apply pressure to activate such actuator upon displacement of the housing with respect to the connector and;

(7) a principal spring means biasing the housing to separate from the actuator;

wherein the housing and actuator are positioned so that upon application of tension to one portion of the connector, the housing will advance towards the actuator, and at a predetermined level of tension, will activate such actuator by applying pressure thereto and thereby and effect release of the latch means and disengagement of the male and female portions of the connector.

In a preferred arrangement of the invention, the actuator is mounted transversely in the connector and is provided with a conically bevelled outer end that contacts with an inner camming surface on the housing, preferably in the form of an annular rim, in order to activate such actuator.

The foregoing summarizes the principal features of the invention. The invention may be further understood by the description of the preferred embodiments, in conjunction with the drawings, which now follow.

SUMMARY OF FIGURES

FIG. 1 is a cross-section of a female coupler;

FIG. 2 is a side view of a male plug with hose attached aligned with the coupler of FIG. 1.

FIG. 3 shows a housing anchored by a chain to a stationary object;

DESCRIPTION OF PREFERRED EMBODIMENTS

In FIG. 1 a female coupling 1 forming part of a connector 2 assembled within a housing 3 is shown. The female coupling 1 has a transversely mounted latch actuator 4 mounted in a transverse bore in the body 5 of the female coupling 1. The actuator 4 is provided with a bevelled external end 6 and a transverse passage 7 to receive a male plug 8 and hose 8a, shown separately in FIG. 2.

The plug 8 carries a barbed engagement ring 9 and a probe 10. The probe 10 presses open the check valve 11 contained in the female coupling 1 overcoming the resistance of the check valve spring 12.

The barbed ring 9 on the plug, when assembled, is locked in place by the latch 13 which is a protruding surface carried on the actuator 4. The actuator 4 is biased by an actuator spring 14 to hold the latch 13 in engagement with the ring 19. Although the actuator 4 is shown as integrally carrying the latch 13, these components may be joined by linkages, allowing the actuator end to protrude in the longitudinal direction from the end of the body 5.

By the application of pressure to the actuator's bevelled end 6, the resistance of the actuator spring 14 may be overcome, and the latch 13 displaced to release the plug 8.

The female coupling 1 is contained within a housing 3 with the access opening 16 for the plug 8 to enter the female coupling 1 accessible through a housing-access opening 17. The female coupling 1 is partially free to slide within the housing access opening 17, such travel being limited by retention-ring 18 and contact between the bevelled end 6 and a circular pressure rim 19 formed on the inside of the housing access opening 17. Displacement of the female coupling 1 towards the rim 19 will create a pressure on the actuator 4 by reason of the angle of the surface 20 formed on the bevelled end 6 of the actuator 4.

The female coupling 1 terminates at the end opposite the access opening 16 with a nippled adaptor 21 that has a protruding nipple 21a and a first central passage 22 for conducting fluid to a hose 28 (shown in FIG. 4). In a basic version of the invention, the nipple 21a connects directly to a hose and the adaptor 21 is retained from removal from the housing 3 by a retention ring 18.

The adaptor 21 has an annular shoulder 23 against which thrusts a principal housing spring 23a. This spring 23a, in turn, thrusts at its opposite end against the housing 3 optionally through a washer 24. The tendency of this principal spring 23 is to move the female coupling 1 and the bevelled end 6 of the actuator 4 away from the pressure rim 19 on the housing 3.

In use the housing 3 is anchored to a stationary object 26, such as a manifold or frame, as by a chain or wire harness 27 as shown in FIG. 4. If the hose 28 is sufficiently sturdy it may also serve to attach the connector housing 3 to a stationary object, so long as sufficient slack is provided to permit the connector to move within the housing.

CONCLUSION

The foregoing has constituted a description of specific embodiments showing how the invention may be applied and put into use. These embodiments are only exemplary. The invention in its broadest, and more specific aspects, is further described and defined in the claims which now follow.

The embodiments of the invention in which an exclusive property or privilege is claimed are defined as follows:

1. A tension-activated auto-disengaging fluid line connector that comprises:
    (1) a connector with complementary, interfitting but disengageable male and female portions, one of such portions being provided with line coupling means for connection to a hose containing a source of high pressure fluid and thereby constituting the pressurized portion of the connector, the other portion of the connector constituting the non-pressurized portion of the connector;
    (2) a spring-activated check valve contained within the pressurized portion of the connector, biased by a check valve spring mounted within the said pressurized portion to displace the check valve towards closure;
    (3) a probe, formed upon the non-pressurized portion of the connector for opening the check valve upon assembly of the connector;
    (4) latch means for releasably holding the male and female connector portions together, once assembled,
    (5) an actuator, connected to said latch means so as to effect release of the latch means by the application of pressure to the actuator, such actuator being accessible from outside of the connector;
    (6) a housing, provided with a means for such housing to be anchored externally to a stationary body, such housing extending over the actuator and positioned to contact and apply pressure to activate such actuator upon displacement of the housing with respect to the connector;
    (7) a principal spring means biasing the housing to separate from the actuator;
wherein the housing and actuator are positioned so that upon application of tension to one portion of the connector, the housing will advance towards the actuator, and at a predetermined level of tension, will activate such actuator by applying pressure thereto and thereby effect release of the latch means and disengagement of the male and female portions of the connector.

2. A connector as in claim 1, wherein the actuator is mounted transversely in the connector and is provided with a conically bevelled outer end and the housing is provided with an inner camming surface positioned to activate such actuator on displacement of the connector towards the camming surface.

3. A connector as in claim 2 wherein the camming surface is in the form of an annular rim.

* * * * *